US009525849B2

(12) United States Patent
Periyannan et al.

(10) Patent No.: US 9,525,849 B2
(45) Date of Patent: *Dec. 20, 2016

(54) PROVISION OF VIDEO CONFERENCING WITH LOAD BALANCING

(71) Applicant: Blue Jeans Network, Mountain View, CA (US)

(72) Inventors: Alagu Periyannan, Palo Alto, CA (US); Emmanuel Weber, San Jose, CA (US); Michael Grupenhoff, Sunnyvale, CA (US); Maulik Shah, San Jose, CA (US); Shacolby Jackson, Menlo Park, CA (US); Prasad R. Mohire, Sunnyvale, CA (US); Brian W. Ashford, Santa Clara, CA (US); Lee Y. Ho, Mountain View, CA (US)

(73) Assignee: Blue Jeans Network, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,081

(22) Filed: Sep. 10, 2015

(65) Prior Publication Data

US 2016/0105641 A1 Apr. 14, 2016

Related U.S. Application Data

(63) Continuation of application No. 14/217,195, filed on Mar. 17, 2014, now Pat. No. 9,154,735.
(Continued)

(51) Int. Cl.
*H04N 7/15* (2006.01)
*H04N 7/14* (2006.01)
(Continued)

(52) U.S. Cl.
CPC ........ *H04N 7/15* (2013.01); *G06F 9/00* (2013.01); *G06F 9/5083* (2013.01); *H04L 12/18* (2013.01);
(Continued)

(58) Field of Classification Search
CPC ............ H04N 7/15; H04N 7/148; H04N 7/14; H04L 12/18; H04L 67/1023; H04L 67/303; H04L 67/306; H04L 12/1827; H04L 65/80; H04L 65/4038; H04L 43/0852; G06F 9/00; G06F 9/5083
(Continued)

(56) References Cited

U.S. PATENT DOCUMENTS 8,482,593 B2 7/2013 Periyannan et al.
8,514,263 B2 8/2013 Periyannan et al.
(Continued)

*Primary Examiner* — Melur Ramakrishnaiah
(74) *Attorney, Agent, or Firm* — Ascenda Law Group, PC

(57) ABSTRACT

Embodiments are described for provision of video conferencing with load balancing. In some embodiments, a protocol connector module receives a media processing request from a client application for the video conference endpoint device and a client application identifier, a profile for the client application is retrieved using the client application identifier, at least one load balancing capability is determined for the client application using the identifier, a load balancing technique is selectively performed based on the at least one load balancing capability, and performance of the client application is logged with the load balancing technique in the profile.

18 Claims, 9 Drawing Sheets

Related U.S. Application Data

(60) Provisional application No. 61/794,619, filed on Mar. 15, 2013, provisional application No. 61/803,296, filed on Mar. 19, 2013.

(51) Int. Cl.
| | | |
|---|---|---|
| *G06F 9/00* | (2006.01) | |
| *H04L 12/18* | (2006.01) | |
| *H04L 29/08* | (2006.01) | |
| *H04L 29/06* | (2006.01) | |
| *G06F 9/50* | (2006.01) | |
| *H04L 12/26* | (2006.01) | |

(52) U.S. Cl.
CPC ....... *H04L 12/1827* (2013.01); *H04L 65/4038* (2013.01); *H04L 65/80* (2013.01); *H04L 67/1023* (2013.01); *H04L 67/303* (2013.01); *H04L 67/306* (2013.01); *H04N 7/148* (2013.01); *H04L 43/0852* (2013.01)

(58) Field of Classification Search
USPC ..... 348/14.01–14.16; 370/260–261; 709/204
See application file for complete search history.

(56) References Cited

U.S. PATENT DOCUMENTS

| | | | |
|---|---|---|---|
| 8,875,031 | B2 | 10/2014 | Periyannan et al. |
| 8,885,013 | B2 | 11/2014 | Periyannan et al. |
| 9,035,997 | B2 | 5/2015 | Periyannan et al. |
| 9,041,765 | B2 | 5/2015 | Periyannan et al. |
| 9,124,757 | B2 | 9/2015 | Weber |
| 9,143,729 | B2 | 9/2015 | Anand et al. |
| 9,232,191 | B2 | 1/2016 | Periyannan et al. |
| 9,300,705 | B2 | 3/2016 | Periyannan et al. |
| 2008/0077666 | A1* | 3/2008 | Sekaran ............. H04L 12/1827 709/204 |
| 2011/0069642 | A1* | 3/2011 | Karam ............... H04L 65/1046 370/260 |
| 2011/0307541 | A1 | 12/2011 | Walsh et al. |
| 2012/0221641 | A1 | 8/2012 | Richard |
| 2013/0162755 | A1* | 6/2013 | Swanson .............. H04N 7/155 348/14.08 |
| 2013/0215215 | A1* | 8/2013 | Gage .................... H04N 7/152 348/14.08 |
| 2014/0092203 | A1 | 4/2014 | Periyannan et al. |
| 2014/0267569 | A1 | 9/2014 | Periyannan et al. |
| 2014/0267577 | A1 | 9/2014 | Weber et al. |

* cited by examiner

PROVISION OF VIDEO CONFERENCING WITH LOAD BALANCING

CROSS REFERENCE TO RELATED APPLICATIONS

This application is a CONTINUATION of U.S. patent application Ser. No. 14/217,195, entitled "PROVISION OF VIDEO CONFERENCING WITH LOAD BALANCING", filed Mar. 17, 2014, which is a NONPROVISIONAL of, claims priority to, and incorporates by reference in its entirety U.S. Provisional Application No. 61/794,619, entitled "SYSTEM AND SERVICE FOR PROVIDING VIDEO CONFERENCING USING GLOBAL LOAD BALANCING FOR CLOUD VIDEO CONFERENCING," filed on Mar. 15, 2013 and U.S. Provisional Application No. 61/803,296, entitled "SYSTEM AND SERVICE FOR PROVIDING VIDEO CONFERENCING USING GLOBAL LOAD BALANCING FOR CLOUD VIDEO CONFERENCING," filed on Mar. 19, 2013.

FIELD OF THE INVENTION

The present invention is directed to providing a video conference system with load balancing.

BACKGROUND

Conventional approaches to load balancing for systems involve the provision of a homogenous solution using a specific load balancing methods. For example, Hyper Text Transfer Protocol (HTTP) requests received from a web browser can be load balanced by: redirecting to different servers using Domain Name Space (DNS) round robin or proxying. So, for load balancing with a conventional approach, all traffic may be load balanced using a chosen method handled by the web browser.

However, such an approach does not work when dealing with different types of client application (i.e., not just browsers) where one method does not work for all client applications used with video conference systems. For example, implementations of redirects for particular client applications are not functional and internal security measures (e.g., firewalls) do not permit redirects to unfamiliar servers (e.g., not on a list of approved resource addresses for a user). As such, an improved approach to load balancing with video conference systems is needed.

SUMMARY

Embodiments are described for provision of video conferencing with load balancing. In some embodiments, a protocol connector module receives a media processing request from a client application for the video conference endpoint device and a client application identifier, a profile for the client application is retrieved using the client application identifier, at least one load balancing capability is determined for the client application using the identifier, a load balancing technique is selectively performed based on the at least one load balancing capability, and performance of the client application is logged with the load balancing technique in the profile.

DETAILED DESCRIPTION

Figure 1:
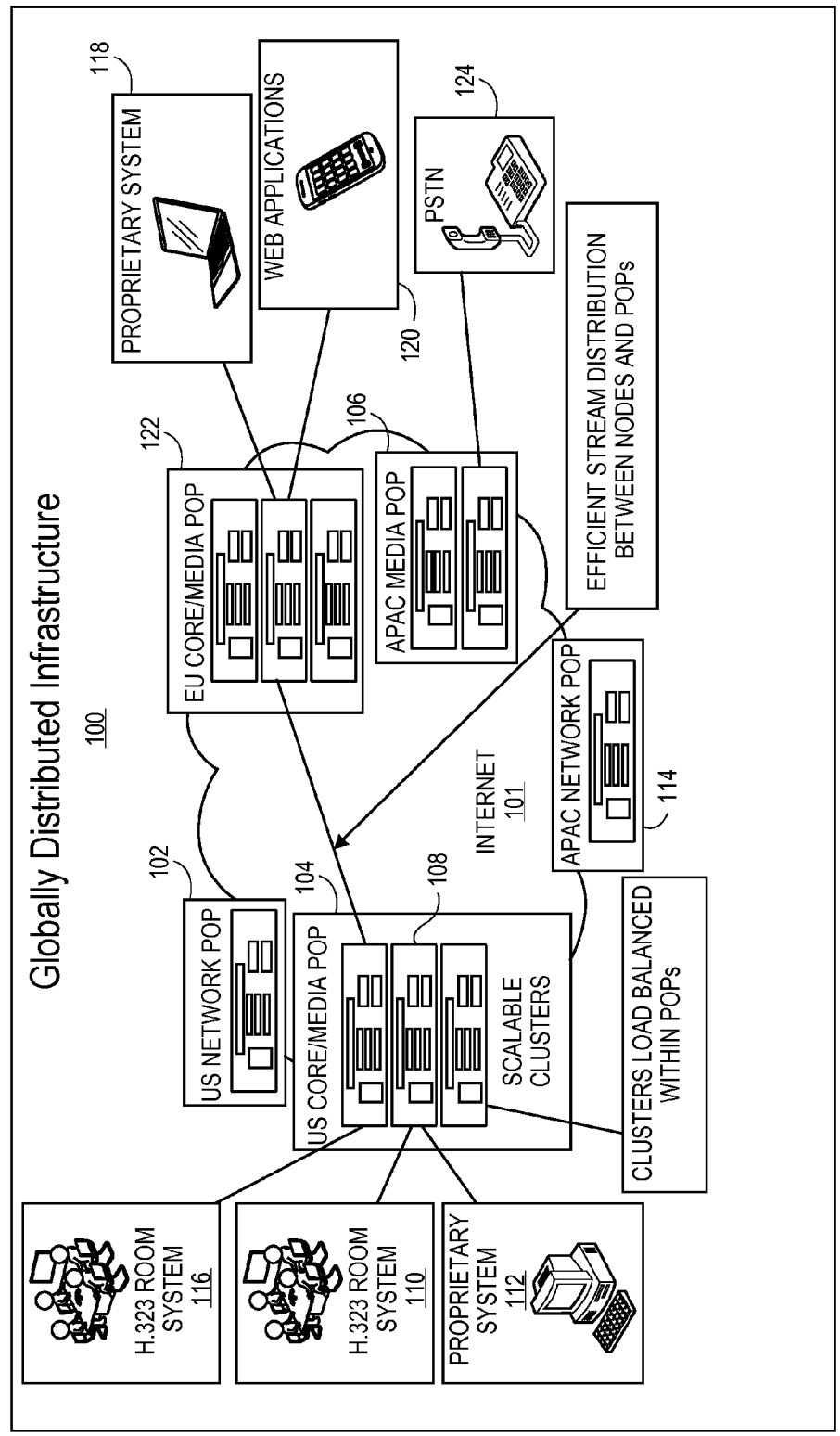
FIG. 1 depicts an exemplary system in accordance with some embodiments of the invention.

Embodiments of apparatuses, computer systems, computer readable mediums, and methods for a video conference system with load balancing are described. In some embodiments, a load balancing technique used by the video conference system is tailored to a particular client application and/or a particular classification for a client application (e.g., device executing the client application, etc.) requesting media processing services from the video conference system. For example, a profile may be stored for a client application, and the profile may be retrieved using a client application identifier upon receipt of request for services by the client application. The profile associated with the client application identifier may have information on load balancing techniques that have previously been performed successfully with the client application and/or classification for the client application (e.g., client application from a communications service provider, communication protocol used by client application, etc.). Communication service providers may include, but are not limited to, the following: providers of Voice over IP (VOIP) services, providers of instant messaging services supporting voice and/or data, providers of other video conference systems, and/or any service provider with client applications that present audio and/or video data streams.

Embodiments of the present invention may identify load balancing techniques that may be used with the client application upon receipt of a request from the client application for media processing services from the video conference system, and the video conference system may select an appropriate load balancing technique dynamically (i.e., on-the-fly) for the identified client application. By way of example, one or more successful load balancing techniques indicated in the profile may be used by the video conference system, if load balancing is desired by a load balancer of the video conference system.

Some embodiments of the present invention may rely on a database of profiles for client applications, classifications for client applications, networks, and/or any combination thereof. The video conference system may be continually learning the load balancing capabilities of the client application and/or the classification for the client application and updating the profile with each learned capability. The profile may provide a list of optimal load balancing techniques that may be used with the client application. By way of example, some client applications are not capable of using a redirect load balancing techniques because redirect functionality is either not supported and/or the implementation of the redirect by the communications service provider for the client application is faulty, and in such a case, a proxy technique may be used instead.

The decision as to whether to load balance may be made based upon one or more metrics by the load balancer. A metric is a measure of performance that may be used by the load balancer to evaluate whether load balancing is desired. Load balancing is used for distributing workloads across multiple computing resources, such as computers, computer clusters, network links, central processing units, servers, nodes, and/or disk drives. Load balancing may aim to optimize resource use, maximize throughput, minimize response time, and/or avoid overload of any one of a plurality of resources. Using multiple components (e.g., resources) with load balancing instead of a single component may increase reliability through redundancy. Load balancing may be desired because it provides a way to spread load among a plurality of servers so that more video conference sessions (e.g., calls, requests, etc.) can be handled by the video conference system as a whole. In some embodiments, load balancing may additionally be desired to ensure the loss of any one server only affects a small fraction of video conferences sessions (e.g., calls, requests, etc.) being handled by that server. Some embodiments may use an accessibility metric in determining whether to load balance in response to a request from an identified client application. The accessibility metric may include factoring in information on servers that are accessible to a client application requesting services of the video conference system using a network. For example, a network may be protected by a firewall that is configured to only allow communication with a set of Internet Protocol (IP) addresses for servers, and the load balancer may make load balancing decisions by factoring in the information on accessible servers to the network.

Some embodiments of the present invention may utilize a database of network profiles. The network profile may contain one or more optimal servers, Core Media POPs, and/or Micro POPs accessible to the network that may be used for load balancing techniques. In some embodiments, performance measurements on each server responding to requests from the client application may be logged or recorded in the network profile. The performance measurements may allow for ranking servers to determine a set of optimal servers to use for the network.

The accessibility metric may be used by the load balancer as a factor in determining whether to load balance for a particular client application using a network. For example, if the client application can only be redirected to one of the servers from the set of servers provided in the profile, then the load balancer may limit the load balancing decision to evaluating only the servers in the set. In another example, if a Micro POP is a server that is accessible to the client application using the network, then load balancer may account for the Micro POP in making load balancing decisions.

The video conferencing system is continually learning the optimal load balancing techniques for client applications and/or optimal servers accessible with use of particular networks. In some embodiments, the video conference system is learning and adapting with every request for media processing services from client applications. For example, the video conference system logs the server (e.g., a data center, a Core Media POP described in more detail below) to which the client application makes requests and the performance of the client application with the server, and in this way is able to learn the optimal servers to use with the client application. Continuing with the example, performance measurements may also be logged on each load balancing technique in the client application profile. Logged performance measurements on the use of load balancing techniques may be used to determine optimal load balancing techniques for the client application.

An object of the present invention is to provide a system and services for providing video conferencing that achieves both geographic distribution as well as local clustering to spread your load across multiple servers in one location. An object of the present invention is to provide load balancing for video conferencing that can change based on several different policies (e.g., customers requesting to only use servers in certain geographies, customers requesting to use a Micro POP on their network for certain conferences), can adapt to real time changes on the Internet (e.g., constantly changing firewall restrictions on networks as users move from one network to another such as WiFi to Cellular) and on a customer-by-customer basis (e.g., load balancing techniques supported by specific client applications, a specific customer applying firewall restrictions on their network or only allowing certain POPs to be accessible from their network).

The video conference system configured in accordance with some embodiments of the present invention may provide a user interface for presentation of the received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013), U.S. patent application Ser. No. 13/105,684, entitled "Systems and Methods for Real-time Multimedia Communications Across Multiple Standards and Proprietary Devices," filed on May 11, 2011 (issued as U.S. Pat. No. 9,035,997 on May 19, 2015), U.S. patent application Ser. No. 13/919,576, entitled "Systems and Methods for Scalable Composition of Media Streams for Real-time Multimedia Communication," filed on Jun. 17, 2013, U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013), U.S. patent application Ser. No. 13/955,646, entitled "Systems and Methods for Scalable Distributed Global Infrastructure for Real-time Multimedia Communication," filed on Jul. 31, 2013 (issued as U.S. Pat. No. 9,232,191 on Jan. 5, 2016), U.S. patent application Ser. No. 13/105,704, entitled "Systems and Methods for Security and Privacy Controls for Videoconferencing," filed on May 11, 2011 (issued as U.S. Pat. No. 9,041,765 on May 26, 2015), U.S. patent application Ser. No. 13/105,716, entitled "Systems and Methods for Shared Multimedia Experiences in Virtual Videoconference Rooms," filed on May 11, 2011 (issued as U.S. Pat. No. 8,875,031 on Oct. 28, 2014), U.S. patent application Ser. No. 13/105,719, entitled "Systems and Methods for Novel Interactions with Participants in Videoconference Meetings," filed on May 11, 2011 (issued as U.S. Pat. No. 8,885,013 on Nov. 11, 2014), U.S. patent application Ser. No. 13/105,723, entitled "Systems and Methods for Real-time Virtual-reality Immersive Multimedia Communications," filed on May 11, 2011 (issued as U.S. Pat. No. 9,143,729 on Sep. 22, 2015), and U.S. patent application Ser. No. 13/251,913, entitled "Systems and Methods for Error Resilient Scheme for Low Latency H.264 Video Coding," filed on Oct. 3, 2011 (issued as U.S. Pat. No. 9,124,757 on Sep. 1, 2015), each incorporated herein by reference in its respective entirety.

The video conference system is described in more detail with reference to FIGS. 1 and 2, and, as illustrated, may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

As a non-limiting example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, H.323 and Session Initiation Protocol (SIP). Additionally, the video conference system may support data streams from a media gateway that converts digital media streams between disparate telecommunication networks, such as from devices using public switched telephone networks (PSTN), SS7, and Next Generation Networks. Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants. Each video conference provides users with a rich set of conferencing and collaboration interaction.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

A globally distributed infrastructure for the video conference system supports the sharing of the event (e.g., the session) among the participants at geographically distributed locations with the use of a plurality of MCUs (Multipoint Control Units), each configured to process the plurality of audio and/or video streams from the plurality of video conference endpoints in real time. Those with skill in the art will recognize that a globally distributed infrastructure is not required to practice the invention. A geographically distributed architecture and/or simply a distributed architecture may be implemented to practice the invention.

Compared to conventional video conference system approaches that require every participant to the video conference to follow the same communication standard or protocol and/or use the same client application from a communication service provider, a video conference supported by the globally distributed infrastructure with at least one MCU at a media server allows the participants of a video conference to participate in a multi-party or point-to-point video conference session in device, address scheme, protocol, and/or communication service provider independent fashion. By conducting manipulation of the video and audio streams transparently in on a remote server (e.g., a server of a POP that is accessible via one or more networks or networks of networks) without end user involvement, the proposed approach brings together video conference systems and applications of different devices, different protocols of video conferencing, and/or different communication services from communication service providers as one integrated system. Communication service providers may include, but are not limited to, the following: providers of Voice over Internet Protocol (VoIP), instant messaging services supporting voice and/or data, and/or service provider with applications that allow for transport of information electronically.

In particular, the video conference system provides the integration of services from different communication service providers (e.g., Skype, and Google Talk) that support different addressing schemes for identifying users on devices. For example, a participant user may login to a Skype client to join a video conference using a communication service identifier (e.g., username, Skype id) and communicate with a participant user who logins to a Google Talk client using an email address. Ordinarily, a communication service provider may require a user to identify each participant on the communication session with an identifier registered with the communication service (e.g., communication service identifier, email address, username, etc.), so that the communication service provider may look up the address of the user endpoint to communicate, and the communication service provider may not support integration with other communication services. The video conference system integrates with the communication service provider services/system seamlessly for the user, so that the user can login with any client application with an identifier registered with the communication service provider and participate in the video conference.

In some embodiments, the endpoint for a participant using a client application is communicating with a corresponding client application for the communication service provider executing as a virtual client application on a server in the backend. A virtual client application is a client application that may be executed on a server of the video conference system to receive data streams from the client application executing on a participant endpoint device, and the output or presentation of the data streams within the virtual client application may be captured and combined with other data streams to form a composite for the video conference. Examples of approaches to video conference systems that support different communication services that may be used in some embodiments are provided in U.S. patent application Ser. No. 13/105,684, entitled "Systems and Methods for Real-Time Multimedia Communication across multiple standards and proprietary devices," filed on May 11, 2011 (issued as U.S. Pat. No. 9,035,997 on May 19, 2015), and U.S. patent application Ser. No. 14/217,275, entitled "Method and Systems for Interfacing Heterogeneous Endpoints and Web-based Media Sources in a Video Conference," filed Mar. 17, 2014 (issued as U.S. Pat. No. 9,300,705 on Mar. 29, 2016), each incorporated herein by reference in its entirety.

Hosting the video conference on at least one media server accessible on a network (e.g., Internet/cloud) allows for the participants to initiate a video conference with any device, supporting any communication protocol, and any client application from a communication service provider, have the system communicate with the other participants at each of their selected endpoint devices, and the other participants may accept the request to join the video conference from any endpoint device using any client application from any communication service provider that he/she wishes. A video conference hosted on a server accessible over the Internet/cloud enables any participant to be able to upload media content to a server (i.e., a node) of the global distributed infrastructure accessible over the Internet (e.g., in the cloud) and have it be retransmitted to other participants in formats of their choice transparently, with or without modifications.

Distributed Infrastructure

FIG. 1 depicts an exemplary system, in accordance with some embodiments of the invention. As shown in FIG. 1, to support the operations of video conferencing, one or more media processing nodes (known in the industry as an MCU) (e.g., nodes of 102, 104, 106, 114, and 122) are used to process and compose video conference feeds from various endpoints, and in particular, the media processing nodes of the globally distributed infrastructure 100 are able to offer a multi-protocol bridging solution to deliver content to disparate endpoints. In the example of FIG. 1, a globally distributed infrastructure 100 enables efficient and scalable processing and compositing of media streams by building the MCUs as the media processing nodes (e.g., 102, 104, 106, 114, and 122) for video stream processing from off-the-shelf components, such as Linux/x86 Central Processing Units (CPUs) and PC Graphics Processing Units (GPUs) instead of custom hardware. These MCUs can be deployed in a rack-and-stack cloud-computing style and hence achieves the most scalable and cost/performance efficient approach to support the video conferencing service. The x86 architecture has improved vastly over the years in its Digital Signal Processing (DSP) capabilities and is able to now support the processing for the video conference system. Additionally, off-the-shelf GPU used for rendering PC graphics can be used to augment the processing power of the CPU and/or any other processor.

In the example of FIG. 1, the globally distributed infrastructure 100 that supports and enables the operations of the video conference has at least one or more of the following attributes:

(1) Ability to support wide variety of audio video formats and protocols;

(2) Scalable mixing and composition of the audio and video streams;

(3) Service delivered across the globe with minimized latency; and (4) Capital efficient to build and cost efficient to operate.

In some embodiments, globally distributed infrastructure 100 may be implemented with clusters of x86 servers both locally on a LAN as well as across geographies serving as the media processing nodes for the MCUs to achieve near unlimited scaling. All of the media processing nodes of the clusters (e.g., 102, 104, 108, 106, and 114) may work together forming one giant MCU. In some embodiments, such clustered design makes use of network layer multicast and a novel multi-bit-rate stream distribution scheme to achieve the unlimited scaling. The globally distributed infrastructure 100 is able to achieve great scalability in terms of the number of participants per call, geographic distribution of callers, as well as distribution of calls across multiple POPs worldwide.

By way of a non-limiting example, globally distributed infrastructure 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. Those with skill in the art will recognize that an implementation of the globally distributed infrastructure 100 for the video conference system with the same number and/or geographic locations for Core Media and/or Network POPs of FIG. 1 is not required and any number of Core Media POPs and Network POPs may be used to provide a content delivery network 103 for a video conference system. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP, described in more detail with FIG. 2) that can handle the processing for the conference so as to allow them to minimize their latency.

Once the participants are in communication with a POP of the globally distributed infrastructure 100, their conference feeds of audio and video streams can be carried on a high performance network POPs (e.g., US Network POP 102, APAC Network POP 114) between the POPs. Additionally, in some embodiments, Network POPs (e.g., US Network POP 102, APAC Network POP 114) can be used for communication (e.g., traffic) with users in places where a Core Media POP does not exist. By way of example, an endpoint can communicate with a Network POP in a more optimal location for communication than the nearest Core Media POP, and the Network POP may send/forward the traffic to a Core Media POP over a private dedicated network so as to avoid use of the open Internet. The globally distributed infrastructure 100 enables media processing nodes to act as one single system.

FIG. 1 depicts an example of a system for media stream distribution processing that may be achieved locally on a Local Area Network (LAN) present in each POP and/or across multiple POPs on the Wide Area Network (WAN). For example, media stream distribution may be handled with a single node media distribution using a single POP (as shown with the use of server 108), where video conference feeds from participants to a video conference via for non-limiting examples, room systems running H.323 (as shown with 110), PCs running H.323, PCs running Skype (as shown with 112), all connect to one node in a POP (as shown with 108) based on proximity to the conference host, where the video conference feeds are load balanced but not clustered among nodes in the POP. In another example, media stream distribution may be handled with clustered nodes media with a POP (as shown with 104), wherein video conference feeds from the participants (e.g., 110, 112, and 116) are load balanced among cluster of nodes at the POP, and the audio/video streams are distributed/overflowed among the nodes in the POP. In another example, media stream distribution processing may be handled with complete media distribution among both the cluster of nodes within the POP (e.g., 104) and among different POPs (e.g., 102, 106, 114, and 122) as well, where some participants to the conference may connect to their closest POPs (e.g., 118 and 120 connect to 122, and 124 connects to 106) instead of a single POP.

In some embodiments, the globally distributed infrastructure 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
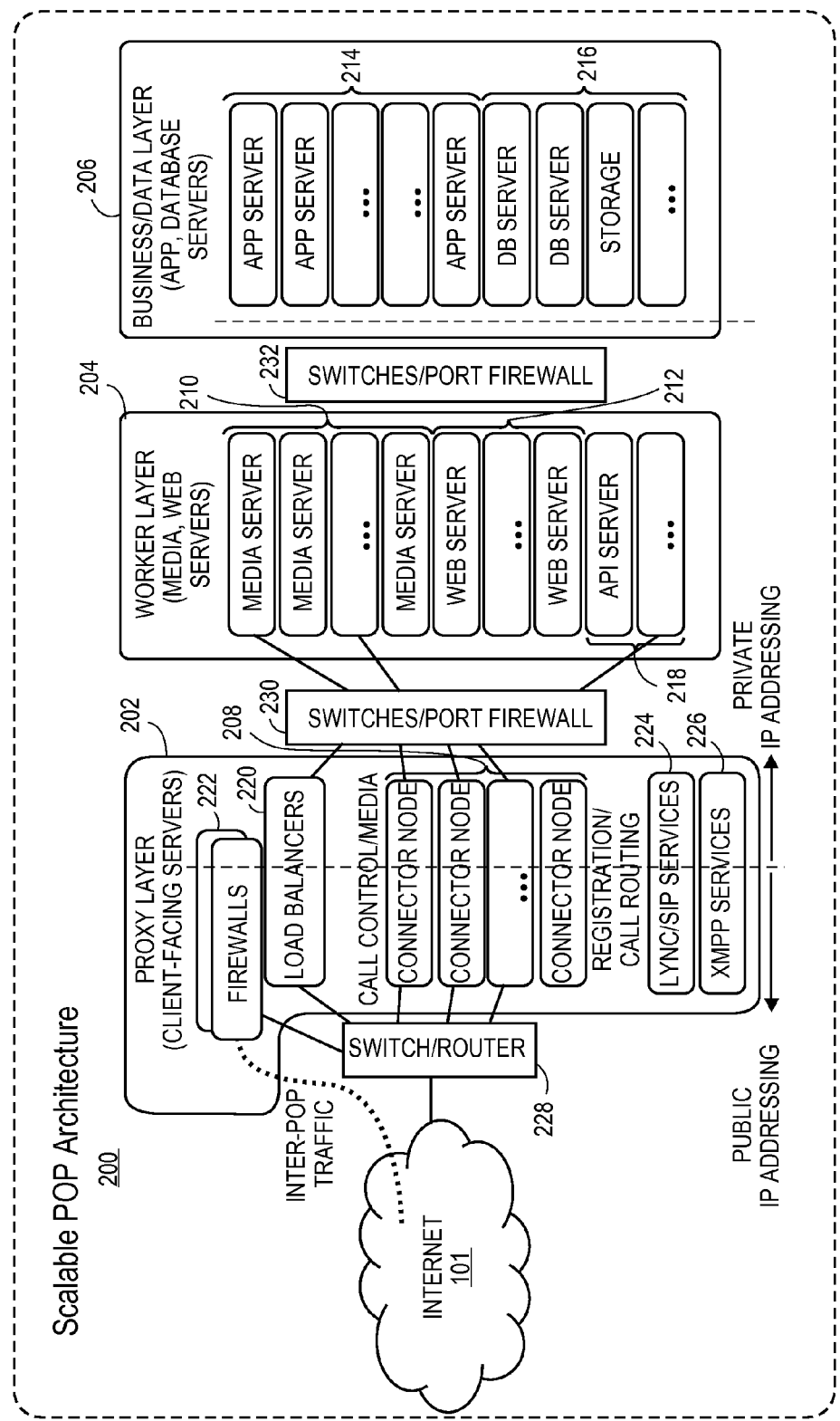
FIG. 2 depicts an exemplary system in accordance with some embodiments of the invention.

FIG. 2 depicts an exemplary system in accordance with some embodiments of the invention. FIG. 2 depicts a Scalable POP Media Processing Node Architecture 200 (e.g., architecture for POPs 102, 104, 106, 114, and 122) accessible over a network 101 with a Proxy Layer 202, a Worker Layer 204, and a Business/Data Layer 206. Some of the components/elements of the Scalable POP Architecture 200, include but are not limited to, the following: load balancers 220, firewalls 222, media servers collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the globally distributed infrastructure 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 210 of the Worker Layer 204, such operation of the media servers 210 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 202 with a protocol connector node 208.

In some embodiments, global infrastructure 100 provides a high-level mechanism for fault tolerant protocol handling to prevent improper input from causing instability and possible security breach via protocol connector 208 or media servers 210. Media processing tasks by protocol connectors 208 and/or media servers 210, such as processing of protocol control messages and compressing audio and video streams may be isolated in one or more separate, independent, unprivileged processes. More specifically, (1) Separate processes: each incoming connection may cause a new process to be created by protocol connector node 208 or media server 210 to handle it. This process may be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. In this way, if this process crashes, no other part of the system may be affected except the conference endpoint handled by that process.

(2) Independent processes: each connection may be handled in its own process. A given process in a protocol connector node 208 or media server 210 may be responsible for one videoconference endpoint, so that if this process crashes, only that single endpoint will be affected and everyone else in the system will not notice anything.

(3) Unprivileged processes: each process should be as isolated as possible from the rest of the system. In some embodiments, to accomplish this, ideally each process runs with its own user credentials, and may use the chroot( ) system call to make most of the file system inaccessible.

(4) Performance considerations: protocol connector 208 or media server 210 may introduce several processes where typically only one exists and brings about the possibility of performance degradation, especially in a system handling audio and video streams where a large amount of data needs to be moved between processes. To that end, shared memory facilities can be utilized to reduce the amount of data that needs to be copied.

In some embodiments, media-processing servers 210 are designed to convert and compose several videoconference feeds of video and audio streams in real-time to create and render one or more composite multimedia streams for each participant to the video conference (e.g., VMR). Media-processing servers 210 may include as its components one or more of: video compositor, video transcoder, distributed multicast video switch, audio transcoder/pre-processor, distributed multicast audio mixer, and each component may be in communication with protocol connector 208 and a distributed conference session controller. In the case of video, the video streams from the participants are made available at the media processing server 210 in three (or more) forms: original compressed video, uncompressed raw video, and a lower resolution compressed thumbnail video.

By way of example, a video compositor of a module executing on a media processing node 210 subscribes to whichever video stream it needs based on the set of videos needed to compose and be rendered to the participants. The two (or more) compressed forms of the video streams listed above may be transcoded by video transcoder sent by distributed multicast video switch using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public Internet, over a private network or over a provisioned overlay network with service level guarantees. Using this approach, video compositor may show various composites, including but limited to, just the active speaker, two people side-by-side if they are having a conversation, and any other custom format as requested by a participant, which may include transformations of the video into other representations as well. Continuing with the example, a video transcoder of media processing server 210 encodes and decodes composite video streams efficiently, where characteristics of each individual stream can be extracted during decoding.

In some embodiments, video compositor not only composes the raw video stream into a composite video stream but also builds up a composite metadata field in order to apply similar operations (including both 2D and 3D operations) outlined in the metadata field to the individual video streams of the composite video. As a non-limiting example, motion vectors need to be applied with the same transformation that video compositor may apply to each raw video stream, including but not limited to, scaling, rotation, translation, shearing. This metadata could be used for other non-real-time multimedia services including but not limited to recorded streams and annotated streams for offline search and indexing.

In some embodiments, application server 214 (e.g., a user experience engine) renders multimedia content including but not limited to the composite audio/video stream to each of the participants to the video conference for an enhanced User Experience (UE) for the participants. The UE provided by the application server 214 to the participants may comprise one or more of the following areas:

(1) Physical interaction with the video conference endpoint. The application server 214 provides a web application that enables controlling the setup and management of a multi-party video conferencing session in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well that the Internet/cloud based software recognizes and translates into actionable events.

(2) User interface (UI) associated with a web application allows the participants to interact with the video conference system for video conference session. Here, application server 214 controls the interaction of the moderator and the conferencing participants. Through an intuitive UI provided by application server, participants to the video conference can control such features such as video layouts, muting participants, sending chat messages, screen sharing and adding third-party video content.

(3) Video/Multimedia content. Application server 214 controls content rendered in the form of screen layouts, composite feeds, welcome banners, etc. during the video conference as well as what the participants see when they log into a video conference, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls.

(4) Customization of the video conference session for a specific (e.g., vertical industry) application. Application server 214 allows customization of the user interface in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

(5) Personalization of the video conference as per the moderator's and/or the participants' preferences and privileges. Application server 214 provides the moderator the ability to personalize the meeting when scheduling a video conference. Examples of such customization include but are not limited to, the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, application server 214 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, application server 214 eliminates a lot of these limitations of the conventional video conference systems. For a non-limiting example, application server 214 enables participant's associated different types of video conference endpoints to talk to each other over the Internet during the video conference. For a non-limiting example, participants from H.323 endpoints can to talk to participants from desktop clients such as Skype, and both the moderator and the participants can choose from a wide variety of options. In addition, by providing the ability to terminate the service in the cloud, application server 214 enables access to a much richer set of features for a conference call that a participant can use compared to a conventional passively bridged conference call. More specifically, every participant can have control of one or more of:

(1) Which active participants to the session to view in his/her video windows on the screen of his/her video conference endpoint.

(2) Layout options for how the different participants should be shown on the screen of his/her video conference endpoint.

(3) Layout options on where and how to view the secondary video channel (screen sharing, presentation sharing, shared viewing of other content) on the screen of his/her video conference endpoint.

Using such in-meeting controls, a moderator can control security and privacy settings for the particular call in ways. The moderator of the call, in addition to the aforementioned options, has a richer suite of options to pick from through a web interface to manage and control the video conference, which include but are not limited to, (1) Muting subsets of participants during a call.

(2) Sharing content with subsets of participants during the course of a call.

(3) Prescribing a standard layout of the screen of his/her video conference point and a set of displayed callers for other participants to see.

(4) Choosing to display caller-specific metadata on the respective video windows of a subset of the participants, including user-name, site name, and any other metadata.

(5) Easy and seamless way to add or remove participants from the video conference call through a real-time, dynamic web interface.

(6) Easily customizable welcome screen displayed to video callers on joining the call that can display information relevant to the call as well as any audio or video materials that the service provider or the call moderators wishes for the participants to see.

In some embodiments, application server 214 enables private conferences by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, application server 214 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

In some embodiments, application server 214 utilizes the MCUs of the global infrastructure 100 to offer an easy, quick, and high-quality solution for event sharing. More specifically, application server 214 enables one initiating participant to invite a group of other participants for a shared video conference call via a web application. Once everyone joins in the VMR to share online videos and content, an initiating participant may provide a uniform resource locator (URL) where the content is located and the content may be streamed into a VMR directly from the content source whether the content is local to the initiating participant device or located remotely and accessed over the Internet from a third party web site or content store. Participants may continue to have conversations with other participants while watching this content. Other features provided include but are not limited to, altering the layout of the content in terms of where it is visible, its audio level, whether it should be muted or not, whether it should be paused or removed temporarily are in the control of the person sharing the content similar to the management and control by a moderator to a video conference as discussed above. Such an approach provides a compelling and novel way to watch live events among groups of people whose locations are geographically distributed, yet want to experience an event together. This enables a whole new set of applications around active remote participation in live professional events such as conferences and social events such as weddings.

In some embodiments, application server 214 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that one need to carry out using the endpoints' native interface and moves all of those functions to a set of interfaces running on a device familiar to most users—desktop PC, laptop PC, mobile phone or mobile tablet, and thus makes the user experience to control the VMR mostly independent of the endpoint devices' user interface capabilities. With such device-independent control of the video conference, application server provides flexibility, ease-of-use, richness of experience and feature-expansion that it allows to make the experience far more personal and meaningful to participants.

In some embodiments, application server 214 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connected to the same VMR hosting the video conference.

Joining a video conference from H.323 endpoints today often involve cumbersome steps, which must be performed via a remote-control for the endpoint device. In addition to logistical issues such as locating the remote in a room, there are learning-curve related issues, such as finding the correct number to call from the directory, entering a specified code for the call from the remote, etc. In some embodiments, an endpoint can be setup to always just dial one number when it is turned on or woken up from sleep. Once the call is established, then a different user interface, such as a web application or mobile device client application, can be used to select which meeting to join.

In some embodiments, application server 214 provides a user experience with a user interface rendering to the participants welcome screen content that includes, but is not limited to, the following: an interactive welcome handshake, a splash screen, interactions for entering room number related info, and a welcome video, etc. for video conferences. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as an agenda, names of the parties calling in, company related statistics etc. Such content could also be more generic for non-business applications, including any flash content including videos, music, animations, advertisements, etc. Upon joining the call, the display also may show a code that is specific to the participant on his/her screen, which can be applied to the content on the call for content sharing. The code can also be entered from a web application used for the call or can be provided through voice or visual commands that are recognized and processed by software in the internet cloud that are then translated into actionable events.

Figure 3:
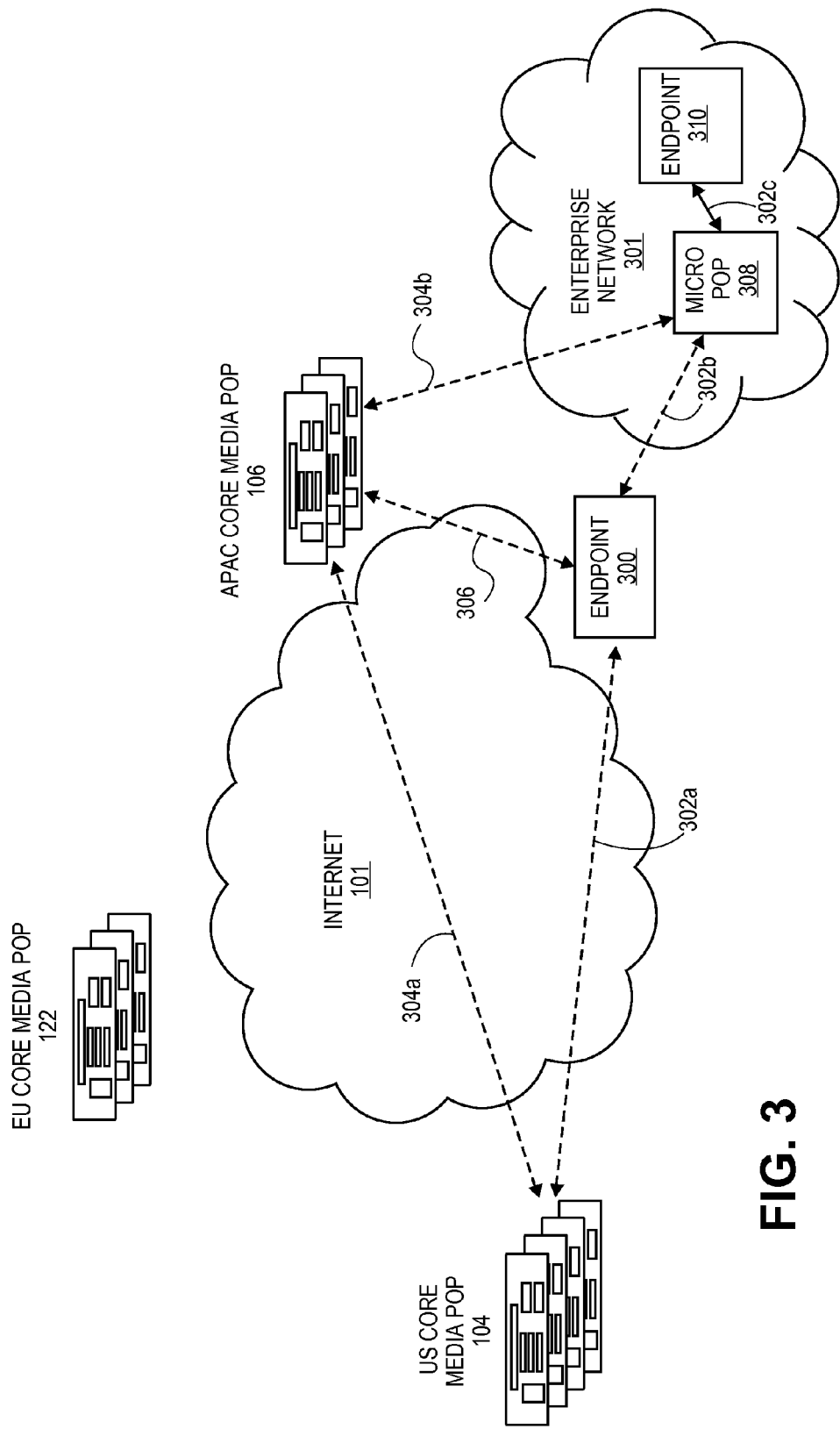
FIG. 3 depicts an exemplary system in accordance with some embodiments of the invention.

FIG. 3 depicts an exemplary system in accordance with some embodiments of the invention. Endpoint 300 may execute a client application that is used to request media processing services from a US Core Media POP 104 as shown with 302a or a Micro POP 308 as shown with 302b. Endpoint 310 may execute a client application that can only access the Micro POP 308 as shown with 302c and cannot access a Core Media POP (e.g., 104 and 106). Hardware and/or software forming a Micro Point of Presence (POP) may be located, accessible, and placed into an enterprise network (e.g., LAN and/or WAN) and offer a set of media processing services for endpoints with access to the enterprise network. An enterprise may be an organization, a corporation, a company, a service provider, a customer, a population of a city or country, and/or any other identifiable group of users with a network. Examples of approaches to Micro POPs for some embodiments are provided in U.S. patent application Ser. No. 14/216,363, entitled "Provision of video conferencing services using a Micro Pop to extend media processing into enterprise networks" filed on Mar. 17, 2014, and herein is incorporated by reference in its entirety. The media processing services request may be a request to join a video conference session, a request to initiate a video conference session, a request to continue participating in a video conference session, and/or any other request of media processing services offered by the video conference system.

Upon receipt of the request at the respective POP (e.g., 104 and 308), a load balancer may determine whether load balancing is desired based on load balancing metrics including, but not limited to, the following:

(1) Client application to Core Media POP and/or Network POP latency measurements. Anticipated latency measurements and/or current latency measurements may be used by the load balancer 220 to make load balancing determinations. Latency is a time interval between the request and the response from the server of the Core Media POP or Network POP.

(2) Geolocation information for the endpoint executing the client application. The Geolocation information is real world geographic location of the endpoint and the load balancer may consider closer Core Media POPs or Network POPs to respond to media processing requests. In some embodiments, the decision to load balance may be based on a set of rules that map geographical locations to IP address, or a set of static rules that can override some of these mappings. Geographic proximity of a client application to a POP can be determined by mapping IP addresses to physical geographic locations based on databases with such mappings and/or can be determined by mapping IP address to network topologies using global routing tables.

(3) Workload on servers of Core Media POPs and/or Network POPs. The workload on servers of POPs may indicate the likelihood that the POP or server can handle requests from the client application. The anticipated workload requirements for a given client application may be considered in determining this metric. For example, if the video conference session includes one or more endpoints that can perform media processing at the client application (e.g., use a reflector MCU described in more detail with FIG. 4), then the anticipated workload may be less than if all media processing requests for the video conference are handled at the POP (4) Load balancing algorithms such as round robin and least loaded servers, etc. as ways to decide how to spread load across many servers. Round robin is algorithm for load distribution is to cycle through a given list of servers in response to each received request to evenly distribute workload. Least loaded servers is a load balancing technique where the least loaded server is provided to respond to the request. Round robin may work well for workload where each request uses the same amount of resources. Least loaded may be used when the workload varies from request to request and it is desirable to keep track of loading the servers evenly based on the current requests being handled by them (5) Accessibility of servers to a given client application. The "accessibility of servers" metric is described below in more detail with FIG. 7. Not all servers are accessible by a client due to firewall restrictions and/or other network topology restrictions, and servers that are not accessible by a client application are not used for that client application.

The above metrics may be applied in a serial and/or parallel fashion in each case reducing the set of servers or POPs among which load balancing it done. In some embodiments, the load balancing may be performed as follows: A) restrictions caused by metric (5) "accessibility of servers to a given client application" (e.g., number 5) are determined first to reduce the number of POPs, so that we can ensure that the client application and server of a POP are accessible to each other; B) metrics (1) and (2) are used to determine the most optimal POP to use. Some embodiments need to use both metrics (1) and (2), since it is not always the case that latency or geolocation information is readily available for every client application the first time the client application connects to the video conference system; and C) metrics (3) and (4) are used to determine the specific server in a specific POP to used for the request. Although an order for application of the metrics for load balancing is described, those with skill in the art will recognize any order of steps of any number of the steps A-C may be performed.

If load balancing is desired, then a load balancing technique is selected that is appropriate for the client application. The capabilities of the client application for various load balancing techniques must be determined. In some embodiments, a database of profiles on client applications may be stored and each profile may provide information on the appropriate technique for an identified client application. By way of example, if the client application can handle redirects, then a redirect technique is used and the endpoint 300 may communicate with APAC Core Media POP 106 directly as shown on with 306. If the client application cannot handle redirects, then the US Core Media POP 104 or Micro POP 308 may serve as a proxy and request processing services from APAC Core Media POP 106 over path 304a or 304b, respectively, and return the request response of path 302a or 302b, respectively.

Figure 4:
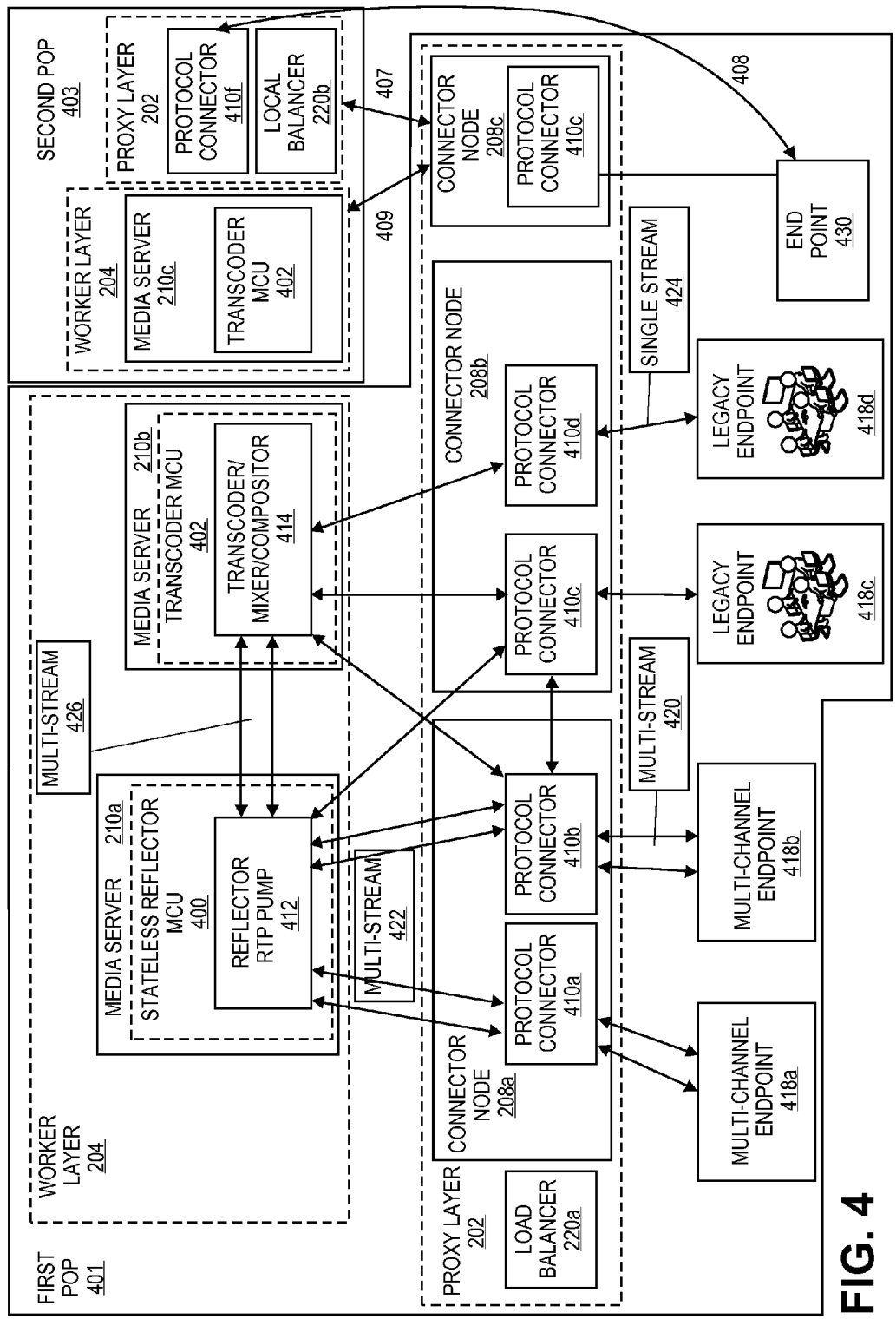
FIG. 4 depicts an exemplary system in accordance with some embodiments of the invention.

FIG. 4 depicts an exemplary system in accordance with some embodiments of the invention. As shown in FIG. 4, endpoint 430 may request to join a video conference and protocol connector 410e on connector node 208c on First POP 401 may initially handle the request. Upon receipt of the request, the protocol connector 410e may request that the load balancer 220a determine if use of load balancing techniques is preferred for the intended client application used with the endpoint 430 during the video conference session. The load balancer 220 may use one or more metrics to determine whether load balancing is preferred.

If load balancing is preferred, then a profile for the type/classification of client application is retrieved and used to determine a load balancing technique to use for the client application. If a redirect technique is used, then the client application may communicate with a server at a connector node on the second POP 403 as shown with path 405. Alternatively, if a proxy technique is used, then either the protocol connector 410e will serve as the proxy and communicate with either the media server 210c (as shown with 407) or the protocol connector 410f on the second POP 403 (as shown with 409) to handle requests and the protocol connector 410e may return the response to the endpoint 430.

FIG. 4 illustrates a stateless reflector MCU 400 used in combination with a transcoder MCU 402 in a proxy layer 202 of the POP architecture 200 in a globally distributed infrastructure 100 for a video conferencing system. Examples of approaches for transcoder MCUs and reflector MCUs used in some embodiments are provided in U.S. patent application Ser. No. 14/216,401, entitled "Provision of video conferencing services using reflector multipoint control units (MCU) and transcoder MCU combinations," filed on Mar. 17, 2014, and herein is incorporated by reference in its entirety. The stateless reflector MCU 400 and transcoder MCU 402 communicate with other elements to handle media processing for a video conferencing session, including, but not limited to, the following: elements in the worker layer 204, business/data layer 206, other reflector MCUs 400, and other transcoder MCUs 402. Instructions may be provided to the reflector MCU 400 and transcoder MCU 402 by protocol connectors 410a-d (collectively 410) managing media processing for their respective video conference participant endpoint devices 418a-d (collectively 418). Each element may be implemented with software, specially configured hardware, and/or any combination thereof.

Participant devices may execute or request execution of a client application on the participant device to participate in the video conference. In some embodiments, one protocol connector 410 (e.g., 410a) is instantiated per participant device 418 (e.g., 418a) to ensure that one protocol connector 410 failure does not cause the entire video conference to fail. A new protocol connector 410 may manage the video conference participant endpoint device upon failure of the protocol connector.

As shown in FIG. 4, protocol connectors 418 may communicate with reflector MCUs 412, transcoder MCUs 414, and other protocol connectors 418 to ensure media processing is performed for the respective participant endpoint 410 that the protocol connector 418 is supporting. In some embodiments, a protocol connector 410 that is supporting an endpoint executing the client application that has the capability to create a composite of data streams for the presentation of the video conference. The stateless reflector MCU 400 may ensure data streams are forwarded to the respective multi-channel endpoint 418a and 418b for composition. By moving the work of creating the composite data stream to the endpoints, work is moved out of the connector nodes 208 of the system and the resources of the endpoints 418 may be utilized where possible to create a system with scalability.

As shown, such endpoints 418a and 418b may support sending and receiving of multiple data streams 420 and/or state information. Similarly, protocol connectors 410 may support multi-stream data stream communication with endpoints 418. Whereas protocol connector 410c and 410d may support legacy endpoints 418c and 418d that receive and send single data streams 424.

In some embodiments, the endpoint 418a and 418b with composition capabilities may support one or more communication protocols for composition of received data streams, and as a result, protocol connector 410 (e.g., 410b) may utilize a transcoder MCU 402 to transcode data streams not supported by the client application at the participant device 418 to be sent for composition at the participant device 418. As shown, in FIG. 4, the endpoints 410a and 410b may support an RTP communication protocol and as such, the underlying reflector may be referred to as an "RTP pump."

Multiple data stream 426 communication may be used between the stateless reflector 400 and the transcoder MCU 402 to improve the speed at which data streams are forwarded to endpoints. As a result, legacy endpoints 418c and 418d may experience higher quality video conferences.

In some embodiments, protocol connectors 410b may communicate with other protocol connectors 410c in order to make adjustments in the provision of data streams to the various endpoint client applications and/or other elements for media processing. Multiple data stream communication (e.g., 420 and 422) may also be used by protocol connectors 410b and 410a with multi-channel endpoints 418a and 418b, other protocol connectors, stateless reflector 400, and/or transcoder MCU 402.

Figure 5:
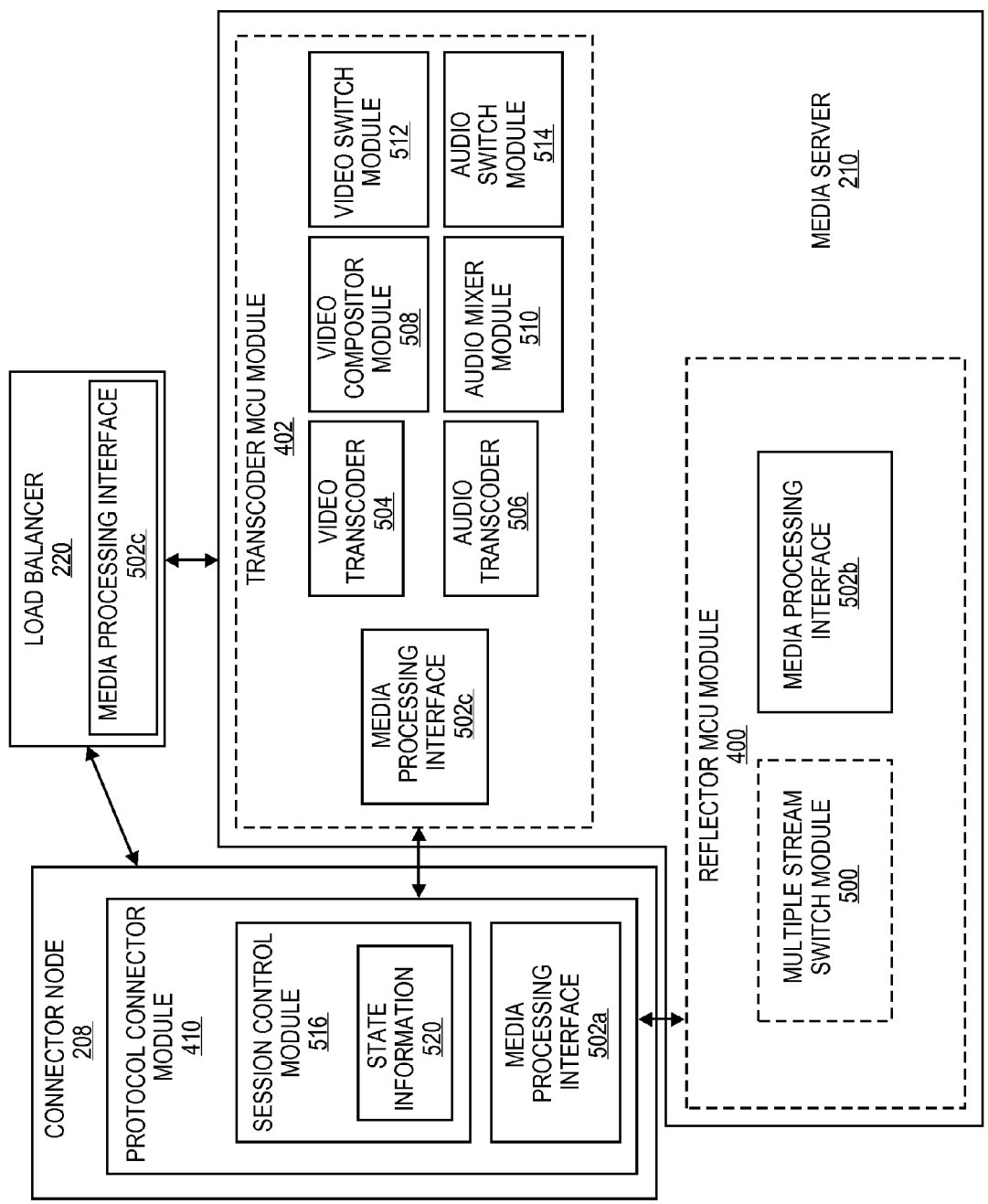
FIG. 5 depicts an exemplary system in accordance with some embodiments of the invention.

FIG. 5 is an exemplary system in accordance with some embodiments of the invention. A load balancer 220 may communicate with connector node 208 and media server 210 elements using media processing interface 502a, 502b, and 502c (collectively 502). The load balancer in particular may communication with the connector node 208 and media server 210 to monitor their respective workload.

In particular, the load balancer 220 may consider the type of services that the media server is providing and how the services may impact the processing capacity of the media server. For example, a transcoder MCU 402 may require more processing than a reflector MCU and this may be used as metric as to the workload of a particular server. FIG. 5 shows an example implementation of a protocol connector 410 that may utilize a reflector MCU module 400 and/or a transcoder MCU module 402. Reflector MCU module 400 may be implemented as software, software and hardware, and/or specially configured hardware. As illustrated reflector MCU module 400 may be instantiated as needed for support of the endpoint that the protocol connector 410 is supporting. In some embodiments, protocol connectors 410 may also share reflector MCUs 400 and the protocol connector 410 may reference the shared reflector MCU module 400 to make requests.

The underlying hardware for the reflector MCU 400 may be a multiple stream switch that is provided instructions by a multiple stream switch module 500, including, but not limited to, the following: a forwarding table, bandwidth instructions, requests to restart, and/or any other instructions for a switch. For example, a forwarding table may be loaded on to the switch to provide instructions on forwarding the data streams to a subset of destination protocol connectors 410 or filtering out a subset of video packets and forwarding the rest. The subset could be every alternate packet thus reducing the frame rate of the video or only packets from a single substream of multi stream video stream.

Similarly, a transcoder MCU module 402 may be implemented with software, hardware, and/or any combination thereof. The transcoder MCU module 402 may be implemented as software and instantiated as need by one or more protocol connectors 410. Similar to the reflector MCU module 400, the software, hardware, and/or combination thereof of the transcoder MCU module 402 may be shared between protocol connectors and the protocol connector may reference the transcoder MCU module 402. The transcoder module may have the following elements: stored state information 502, a video transcoder 504, an audio transcoder 506, a video compositor module 508, an audio mixer module 510, a video switch module 512, an audio switch module 514 and/or any other module used for transcoding and/or media processing to form a composite of data streams. The video transcoder 504 and audio transcoder 506 may decode the data streams and encode the streams into a supported communication protocol. The video compositor module 508 and the audio mixer module 510 may be used to combine streams into composite streams. Video switch module 512 and audio switch module 514 may be used to send instructions to the underlying switch sending data streams to endpoint devices.

The session control module 516 may control the video conference session and have access to the state information 520 for the video conference session and the endpoint supported by the protocol connector 410. In some embodiments, the session control module 516 may be a reference to a meeting session level video conference controller accessible to protocol connectors (e.g., a singleton design pattern ensuring a single point of reference and control of the meeting session that may be referenced by protocol connectors of the video conference). State information may be stored with the protocol connector 410 and/or within data storage, such as file system, database, and/or any other data store to allow for media processing elements to be restarted or easily recreated with the video conference and endpoint state information.

Figure 6:
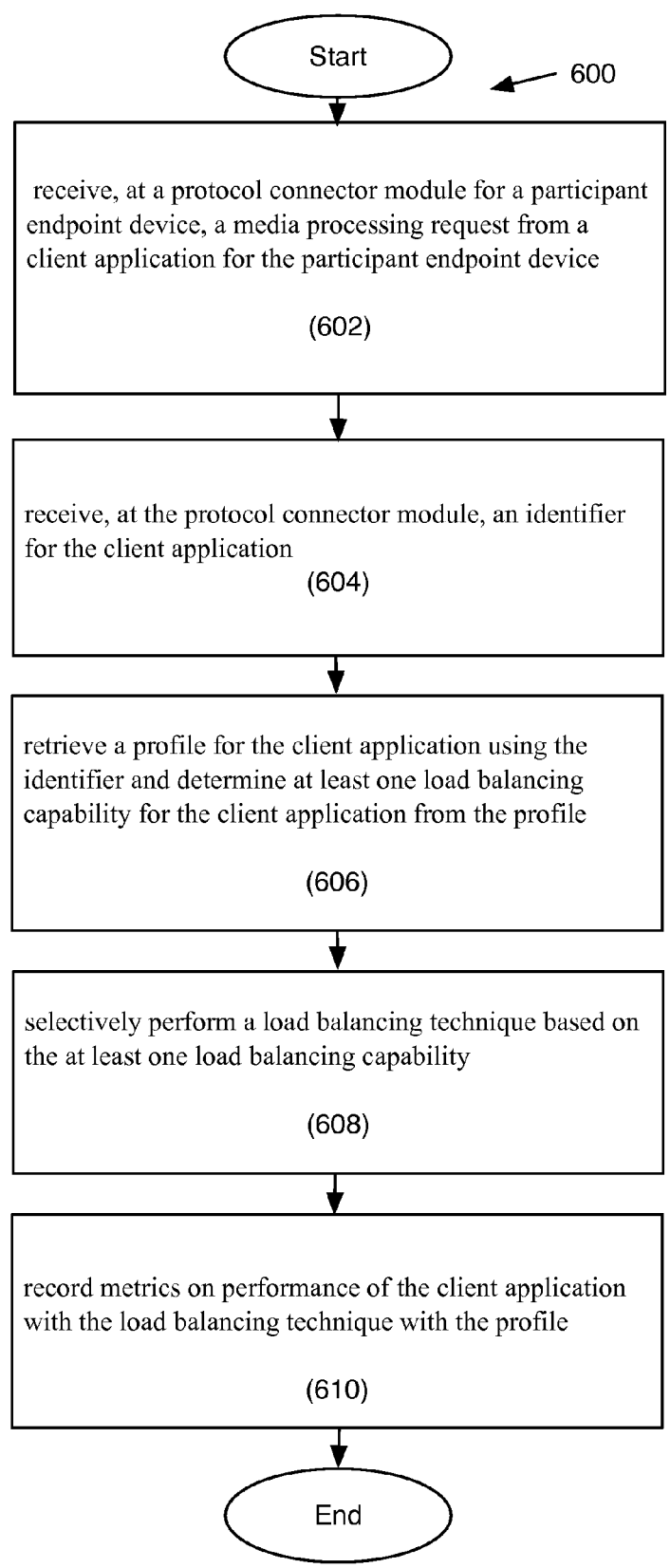
FIG. 6 is a flowchart for an exemplary process in accordance with some embodiments of the invention.

FIG. 6 is an exemplary flowchart 600 in accordance with some embodiments of the invention. A protocol connector module for a participant endpoint device may receive a request from a client application (602). The request may be a request to join a video conference session, a request to initiate a video conference session, a request to continue participating in a video conference session, and/or any other request of media processing services offered by the video conference system. An accessibility metric that may be used by the load balancer is described in more detail below with FIG. 7. Upon receipt of the request, the load balancer may determine using one or more metrics whether load balancing is preferred.

In some embodiments, the load balancer may be triggered with the first request to the video conference system for services (i.e., when the user first requests to join a conference and before selection of a client application to use with the video conference system), and the video conference system may perform load balancing using URI techniques (described in more detail below) before the user has selected a client application for execution, launched the client application, and/or invoked the client application the video conference.

The protocol connector module may receive a client application identifier (604). The client application identifier may be provided by request from the client application and/or taken from the request received from the client application. For example, the client application identifier may be retrieved from a header received with the request. By way of example, an HTTP request may provide metadata with the header that identifies the client application. Another example, the client application identifier may be the software versions and vendor of the client application.

The identifier for the client application may be any identifier that can be used to retrieve a client application profile for the client application and/or a classification for the client application. The classification of client application may include, but is not limited to, the following: a classification for services offered by the client application (e.g., a video, voice, and/or telepresence services offered), a name and/or a version of software executed by the endpoint device for the client application, a name for a suite of software applications including the client application, a communication services provider offering the client application, an endpoint device used to execute the client application, and/or any other classification for a client application. An identifier may be a word, number, letter, symbol, or any combination of those.

The identifier may include, but is not limited to, the following: a client application classification identifier, a client application identifier (e.g., a software name), a version for a client application, a device identifier, a communication service provider identifier, an identifier for a communication protocol used by the client application, a client application name, and/or any other identifier or combination thereof. Although identifiers for devices and/or communication service providers may not allow for exact identification of the software and version for the client application, a history of the performance of client applications with various load balancing techniques from similar devices, communication protocols, and/or communication service providers may provide a basis for determining a load balancing technique more likely than not to work for the client application.

A client application profile may be retrieved using the client application identifier (606). Profiles may be stored for each client application that makes request to the video conference system, and the profile may have at least one load balancing technique that may be used with the client application. If this is the first request received by the video conference system from the client application, then a default load balancing technique capability may be placed in the client application profile. For example, the default load balancing technique for the video conference system may be a proxy load balancing technique. In another example, the video conference system may request information from the client application on the load balancing techniques the client application supports and place the techniques in the profile. The video conference system may dynamically change the list of capabilities for the client application based on the performance of the client application with the techniques.

In some cases, a client application may fail, if the client application is not capable of handling the technique. For example, if an H.323 client application (i.e., an client application that implements an H.323 standard) sends a request to join a video conference and the system responds by sending a H.323 protocol level redirect request to the client application, the H.323 client application may crash (e.g., fail) if the redirect method is not implemented or implemented poorly. If this happens a customer/user using that client application with the video conference system may attribute the failure to the video conference system services, even though the client application may be at fault due to a poor implementation of the redirect functionality.

To ensure the video conference system works well in an environment with clients having varying degrees of success with implementation of load balancing techniques, performance of the client application with various load balancing techniques may be logged and a list of optimal load balancing technique capabilities for the client application may be maintained. In a case where a client application implements functionality of a standard and has an unsuccessful history for execution of the functionality of the standard, the video conference system store other load balancing techniques to use for the client application in the profile. For example, if a history of failed implementations for redirects is logged in the profile for the client application, then the video conference system may provide a proxy to a server as the primary method of load balancing for the client application and/or classification of the client application. But, in other cases, such as when a client application has a history of successful implementation of a redirect load balancing technique, the video conference system may redirect the client and avoid the onus of proxying, and list a redirect load balancing technique as a capability for the client application.

The protocol connector module may selectively perform load balancing technique based on the at least one load balancing technique capability in the profile (608). If one or more techniques are provided with the profile for the client application, then the load balancing technique that has the best performance record may be used. The performance of the client application with the load balancing technique may be logged in the profile (610).

Proxy Load Balancing Technique

In some embodiments, to handle load balancing, proxy techniques are used for sending data packets to a client application on a video conference device of a participant. A proxy is a server that acts as an intermediary for requests from clients seeking resources from other servers and/or systems. The client may connect to the proxy server, request a service, and the proxy server may evaluate and/or handle the request by requesting one or more services from other servers, providers, and/or systems. Proxying may be performed in such a way that the endpoint device is not aware that the video conference system is using a proxy load balancing technique. For example, a client application (e.g., a customer of the video conferencing services) may request media processing services from one of a plurality of POPs (e.g., POPs as described in more detail in FIG. 1), and it may not be the optimal POP location (or server from the POP) from the plurality to service the request, and the protocol module may act as a proxy and requests services from a POP in an optimal location.

In some embodiments, a set of rules based on geographical mappings to IP addresses or a set of static rules that can override these mappings may be used to identify an optimal location for proxying. By way of example, IP address to geographical mappings can be acquired from sources (commercial and free) who maintain such mappings in a downloadable database and this database may be used in conjunction with a set of rules that map different continents or countries to a specific POP location (e.g., all of Asia can be mapped to be sent to the Singapore POP, all of Europe can be mapped to be sent to the Amsterdam POP and the rest of the world can be sent to a POP in Virginia, USA.) In some cases, geographic mappings in the database may be outdated and specific IP addresses can be mapped to a specific POP using a list to override the general rules.

In some cases, proxying is efficient for media processing, because once proxy of control signaling is achieved, then all the media flows from the closest place rather than through the proxy. For a client application that does not have access to a directory to look up IP addresses from a domain name (e.g., Domain Name System (DNS) based lookup) or a phone number style number, a constant IP address (or set of IP addresses) can be used by the client application to send requests and receive responses from the video conference system. In such a case, the handling of requests is seamless to the client application as one well known IP address is used by the client application, and all of the proxying is done transparently by the video conference system. The advantage of such an approach is that client application and users may need to only remember one well known address to reach the video conference system. However, proxying is not always the most efficient approach since it may take resources to proxy the signaling (e.g., even though the media data streams may not be what is bandwidth intensive) over to the other location and creates another potential point of failure when compared to a system that redirects clients to the alternate location instead of proxying.

In some embodiments, the implementation of the proxy is very simple to provide the clients connecting to the servers in the POPs with stability. For example, the video conference system may be implemented with protocol connectors in a proxy layer that sends requests to the media servers in the worker layer to transcode and create composites with data streams. Continuing with the example, if the media server fails, then the protocol connector serving as a proxy is not affected and the client application may only encounter a short delay as the protocol connector arranges for the work to be handled by another server. By way of further example, if the protocol connector fails, then only the participants' data streams handled by that protocol connector are affected and not all participants of a video conference are affected.

In some embodiments, the proxies (e.g., protocol connectors in the proxy layer) can be "chained" together forming a first and a second layer of proxies. An example implementation for is chaining is, as follows: a first proxy may send a request to a second proxy (e.g., part of a second layer of one or more protocol connector proxies), and the second proxy may then send the request to media servers in the worker layer of a POP. In this example, the first proxy can be implemented as a simple pass through proxy (e.g., using off-the-shelf Transmission Control Protocol (TCP) load balancers) that spread the load across the second layer of proxies that do more involved load balancing using the metrics and techniques described in reference to FIG. 3. This approach may provide the ability to maintain a single IP address for a larger set of proxies and provide that the failure of a single proxy may only affect data streams of a participant handled by that proxy. In particular, with this implementation, simpler TCP load balancers may be used that are less prone to failure and can be run in redundant pairs, thereby allowing this multi-layer proxy design to be more robust than a single layer of proxies.

In some embodiments, depending on the type of device connecting to the video conference system, the system can spread the load across multiple servers of one or more POPs to scale and without impact to the provision of services. The video conference system can be configured with definitions for each piece of hardware and/or software that is part of the video conference system. For example, the video conference system can be provided with a definition for how much workload the hardware can handle (e.g., a server) and the different types of functionality that the hardware can support (e.g., transcoding MCU processing versus reflector MCU processing). These definitions can be used the load balancer to spread our workload by proxying to different backend protocol servers based on each of their capabilities and capacities.

In some embodiments, the video conference system and/or a POP can use a single IP address, so users only need to remember a single IP address, even though they can be talking to different POPs. This single IP address can be assigned to a POP at any given time. Using Internet routing techniques, the video conference system can make sure that the single IP address is supported even after failure of any of our POPs. For example, in FIG. 1 the IP address may initially be assigned to a server in US Core/Media POP 104 acting as the proxy for data streams from endpoints as shown. If there is a disaster and the US Core/Media POP 104 is out of commission then the same single IP address may be transferred to a server in the EU Core/Media POP 122. And Internet routing techniques can be used to send all future calls to that POP 122. Such a technique of transferring the IP address will allow video conferences to continue after a momentary pause in the case of a disaster.

Redirect Technique

A redirect technique may be used to redirect or forward requests to a different server from the server that initially received the request, such as redirecting to a server in a location that is closer to the geolocation of the endpoint device. The capability of the client application to use the redirect technique may depend on whether the client application and/or device has properly implemented the redirect functionality. In some cases, a client application may implement redirect functionality, but the implementation offered by the client application may not work. In such a case, the performance of the client application in handling the redirect request may be logged and stored in the profile for the client application.

In some embodiments, the profile may be used to indicate when to do redirect based on the type of device executing the client application. The video conference system adapts based on the device in communication with the servers to dynamically perform either proxying techniques, redirect, and/or some other load balancing technique.

In other cases, the redirect may not work because the user has a firewall, which only allows communication with particular POPs. The video conference system is learning from the performance of the client application with various load balancing techniques. When a redirect does not work due to firewalls, the system logs the results and adapts so the client application is not redirected and/or proxied. For example, the video conference system may recognize the client is using a network protected by a firewall, and the system may not perform redirect and/or proxying techniques. This may allow the system to be successful albeit without the most efficient load balancing, but the important aspect in some embodiments may be to ensure the system does not fail.

HTTP Redirect Load Balancing Technique

Hypertext Transfer Protocol (HTTP) is an application layer protocol that functions as a request-response protocol in the client-server computing model. A web browser client application may submit HTTP request message to a server and the server may respond with a redirect to another URI.

URI Load Balancing Technique

In some embodiments, a user may select to join a conference using a particular client application with the web application for the video conference system. The user may use their browser to navigate to the web page for the web application with a URL provided in an invitation to participate in the conference (e.g., included in a calendar event). The web page displayed within the browser may have links to URIs for each type of client application that may be used to join the video conference. The user may select join the conference with the provided URI for the type of client application and the URI may designate a server to be used. In this way, load balancing decisions may be made before a user has begun requesting media processing services with the client application. The video conference system can determine which load balancing technique is preferred for each client application type DNS Load Balancing Technique DNS round robin is a technique of load balancing of servers by managing the DNS responses to address requests from client applications according to an appropriate statistical model. In a simple implementation, Round-robin DNS works by responding to DNS requests not only with a single IP address, but a list of IP addresses of several servers that host identical or nearly identical services that may or may not be geographically distributed. The order in which IP addresses from the list are returned is the basis for the term round robin. With each DNS response, the IP address sequence in the list is permuted (e.g., first permutation is 1=IP address a, 2=IP address b, 3=IP address c, second permutation is 3=IP address a, 2=IP address b, 1=IP address c, third permutation is 2=IP address a, 1=IP address b, 3=IP address c, etc.) Client application attempt connections with the first address (e.g., 1) returned from a DNS query, so that on different connection attempts, clients would receive service from different providers, thus distributing the overall load among servers. In some embodiments the list is permuted in such a way that the first address is the address of a server in the closest POP to the client's own DNS server and subsequent addresses are other server addresses on that POP or other POPs that are the next closest.

By way of example, when load balancing is preferred, the system may use an ordered list of techniques and check the profiles for the client application and accessibility to servers to determine the best technique to use. Continuing with the example, the techniques may be applied as follows: 1) Check the profile for the client application to determine if the client application supports redirects; 2) Use URI technique on the web page of the web application for the video conference system before the client application has been selected for execution, launched, or invoked for the video conference when requested by the user. In particular, the URI technique may be used for client applications that are known not to support redirects. 3) Use HTTP redirect techniques; and 4) Use proxying when the profile indicates that the client application does not support redirects.

Figure 7:
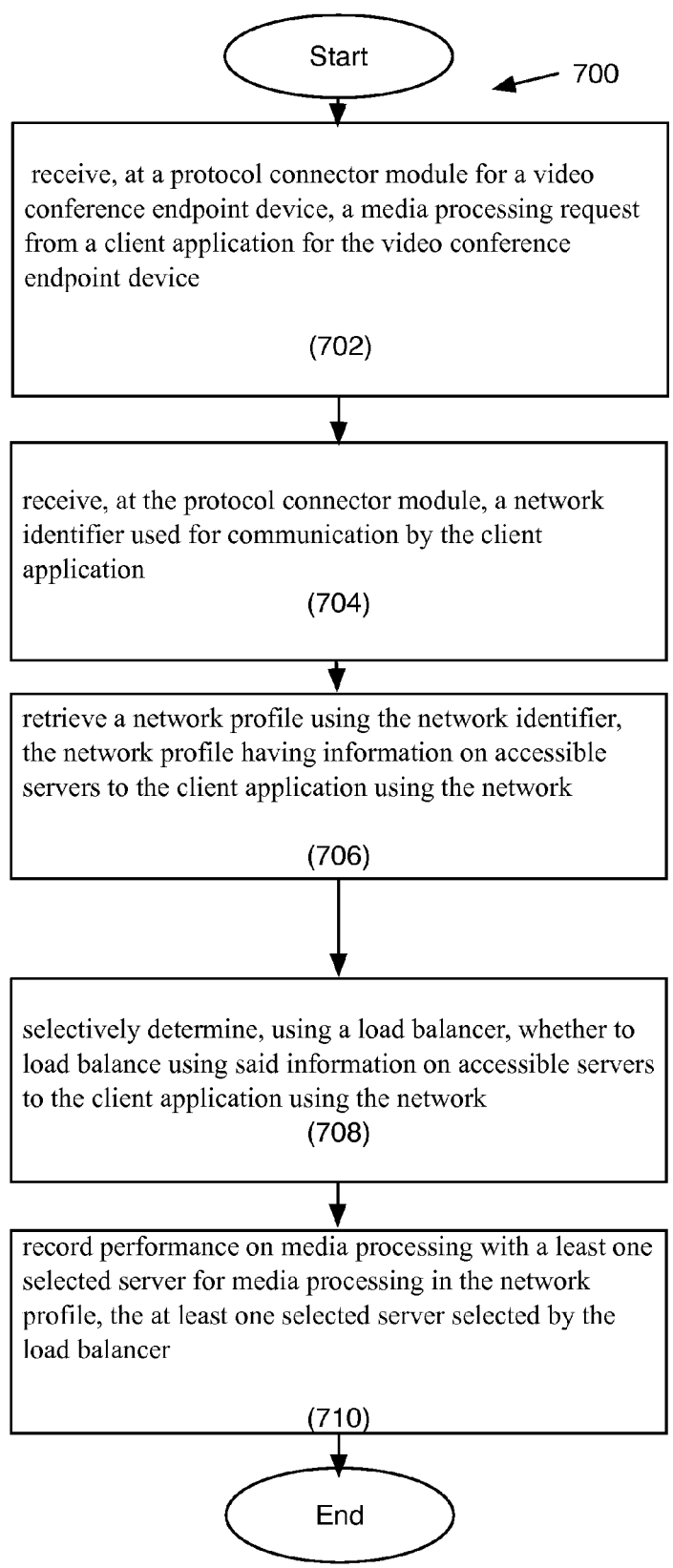
FIG. 7 is a flowchart for an exemplary process in accordance with some embodiments of the invention.

FIG. 7 is an exemplary flowchart in accordance with some embodiments of the invention. A protocol connector module for a video conference endpoint device may receive a media processing request from a client application for the video conference endpoint device (702). The protocol connector module may receive a network identifier for a network the client application is using to communicate with the video conference system (704). The protocol connector module may receive the network identifier in response to a request to the client application and/or the protocol connector module may determine the network identifier from the received request (e.g., metadata in the request).

A network identifier may be a username for accessing the video conference system, a domain name, a name for any identifiable group, an enterprise name, an organization name, a customer name, a communication services provider, an IP address, a client application identifier, a client application classification identifier, any other identifier for a network, and/or combination thereof. A combination of identifiers, such as a client application identifier and a network identifier combination or a network identifier and a communication service provider identifier, may be used to determine the accessibility for the client application. In the case of the combination of identifiers, profiles may be retrieved for each identifier and an intersection of the servers may be used, and/or a profile may be retrieved associated with both identifiers.

The protocol connector module may retrieve at least one network profile associated with the network identifier (706). A network profile may be retrieved from a database of network profiles. The at least one profile may have information on any number of servers or POPs (e.g., Core Media POPs or Micro POPs) of the video conference system that are accessible using the network (and/or with the client application). If a network profile associated with the network identifier does not exist in the database, then a network profile may be created for the network and no information on accessible servers may be known. If a network profile exists for the network profile identifier, then information on any number of servers accessible to the network may be provided. For example, networks are protected by firewalls and the firewall may be configured to only allow the client application and/or any client application to communicate with a restricted set of servers (e.g., identified by IP addresses) over their network, and a set of one or more accessible servers provided in the network profile may be a best estimate as to which servers are accessible for client applications using the network.

The profile may provide information on the performance of the client application using each server in the profile. The set of servers and performance statistics for each server in the list may be a static list configured by an administrator for the video conference system and/or a list dynamically learned and adjusted over time based on the performance of the client application using the network with servers of the video conference system. By way of example, each time the client application attempts to request services of a server using the network for the network identifier, the performance of the server in servicing the requests is recorded. Continuing with the example, if the server fails in servicing the request, then the server may be removed from the set of servers for the profile associated with the network identifier, and it may be assumed that the firewall blocked communication with the server.

In some embodiments, a communications service provider for the client application may also restrict communication to particular servers. For example, if the communications service provider wants to configure their firewall to allow access to more IP addresses for servers or POPs of the video conference system (e.g., to allow access to servers in new geographic locations), then the communication service provider may also need to inform each user of their client application about these new addresses and request each user to open up the firewall for their network to these new addresses. In such a case, this means that the communications service provider may not be able to load balance across all these addresses until every user of the client application has added these addresses to their respective network firewall. The communication service provider may find this onerous and inhibiting their ability to add more servers in more geographies without informing all users and waiting for them to finish updating their firewall restrictions. Alternatively, if the communication service provider allows their client applications to be load balanced across servers not accessible by all of their users, then the communication service provider runs the risk of having a failure due to firewall restrictions attributed to their client application The load balancer may selectively determine whether to load balance using information on at least one server accessible to the network (708). The load balancer can make a decision as to whether to load balance with information on which servers are accessible to the client application. The list of servers that are accessible to the client application using the network may serve as an accessibility metric that may be factored in with one or more other metrics to determine whether to load balance. For example, load balancing to move requests to another server for media processing may be preferred but not feasible because other servers may not be accessible to the client application. In another example, if the client application has access to a Micro POP, then the load balancer may add the Micro POP to a list of possible candidates for sending requests from the client application.

Performance on media processing with the at least one server selected for media processing may be recorded in the network profile (710). Performance measurements may include, but are not limited to, the following: latency (e.g., time interval for response by the selected server), success or failure of servicing request with selected server, and/or any other performance measurement for the server. The video conference system may tune and/or select the optimal server for the client application and/or the network based on real time and/or historical performance measurements.

In the above example involving communication service providers, the communications service provider may allow access to additional servers that can benefit customers that do not have firewall restrictions and at the same time, continue to service users that have firewall restrictions because the video conference system stores a profile on each network for their users.

In some embodiments, the profile may indicate Micro POPs accessible to client applications using the network. A Micro POP is only accessible to users with access to the enterprise network that the Micro POP supports. This allows the load balancer to know when to consider Micro POPs in a load balancing decision.

Figure 8:
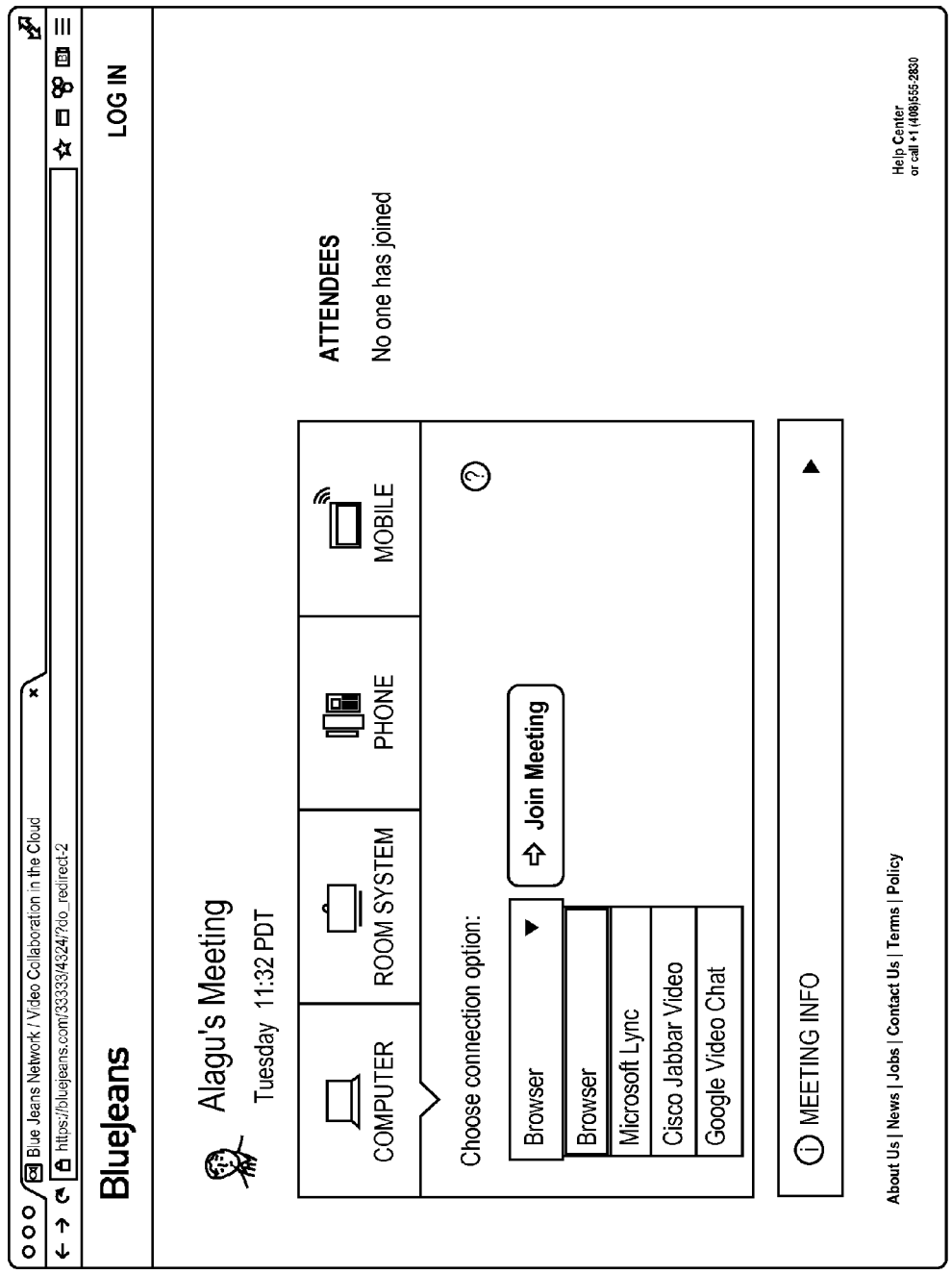
FIG. 8 depicts an exemplary user interface in accordance with some embodiments of the invention.

FIG. 8 depicts an exemplary user interface 800 in accordance with some embodiments of the invention. As shown in FIG. 8, a user may request to join a conference and be presented with a web page that allows the video conference system to perform a load balancing decision when a user selects to join the meeting using a particular client application. By providing a universal resource identifier (URI) 804, such as "http://bluejeans.com/33333/4324," the user has chosen which conference to join. Continuing with this example, the user chooses to join using "Microsoft Lync" in drop down menu 802 and then clicks "Join Meeting." At this time the video conference system selects a server of a POP to send the request for the particular client application, and returns the selected server information to the browser, so that the browser can launch a client application (e.g., Microsoft Lync application) with the selected server. The decision can be made by the video conference system whether to load balance for each type of client application when the user selects to join the application, but before the user has launched the type of client application. The video conference system can specify a server of a POP to send the requests for the particular client application with a URI passed to the client at the time it is launched. In some embodiments, if a client application does not support redirects, then the URI technique may be used to avoid using a proxy since it enables the client to directly communicate with the server to which the load balancing module of the video conference system selected.

Figure 9:
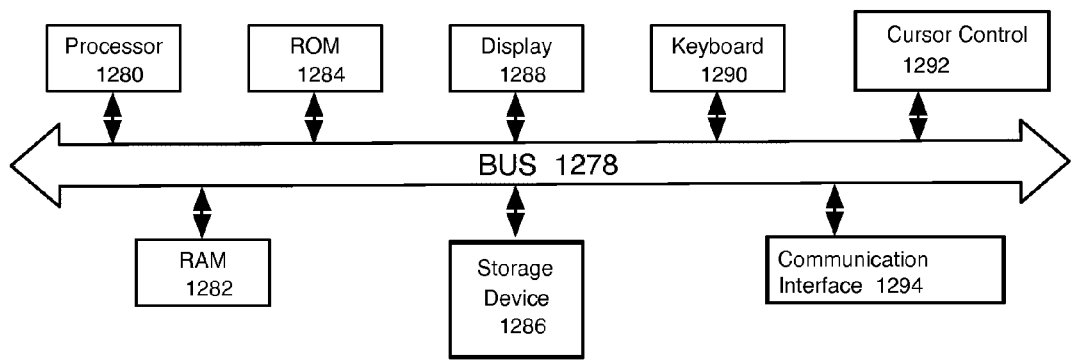
FIG. 9 depicts an exemplary system in accordance with some embodiments of the invention.

FIG. 9 provides an example of a computer system 1276 that is representative of any of the computer systems or electronic devices discussed herein. Note, not all of the various computer systems may have all of the features of computer system 1276. Computer systems such as computer system 1276 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 1276 includes a bus 1278 or other communication mechanism for communicating information, and a processor 1280 coupled with the bus for processing information. Computer system 1276 also includes a main memory 1282, such as a random access memory (RAM) or other dynamic storage device, coupled to the bus for storing information and instructions to be executed by the processor. Main memory 1282 also may be used for storing temporary variables or other intermediate information during execution of instructions to be executed by processor 1280. Computer system 1276 further includes a read only memory (ROM) 1284 or other static storage device coupled to the bus for storing static information and instructions for the processor 1280. A storage device 1286, which may be one or more of a hard disk, flash memory-based storage medium, or other storage medium, is provided and coupled to the bus 1278 for storing information and instructions (e.g., operating systems, applications programs and the like).

Computer system 1276 may be coupled via the bus 1278 to a display 1288, such as a liquid crystal or light emitting diode display, for displaying information to a user. An input device 1290, such as a keyboard including alphanumeric and other keys, is coupled to the bus 1278 for communicating information and command selections to the processor. In some embodiments, the keyboard will be a software construct rendered via a touch screen display 1288. Another type of user input device is cursor control device 1292, such as a mouse, a trackball, cursor direction keys, and/or any other input device for communicating direction information and command selections to processor 1280 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented using a processor 1280 executing appropriate sequences of computer-readable instructions contained in main memory 1282. Such instructions may be read into main memory from another computer-readable medium, such as storage device 1286, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 1280 and its associated computer software instructions to implement the invention. The computer-readable instructions may be rendered in any computer language including, without limitation, C#, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1276 or similar electronic computing device, that manipulates and transforms data represented as physical (electronic) quantities within its registers and memories into other data similarly represented as physical quantities within its memories or registers or other such information storage, transmission or display devices.

Computer system 1276 also includes a communication interface 194 coupled to the bus 1278. Communication interface 1294 provides a two-way data communication channel with a computer network, such as a network, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1278 can send and receive messages and data through the communication interface and in that way communication with hosts accessible via the Internet. Computer system 1276 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1276, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention.

What is claimed:

1. A method comprising:
   receiving, at a server of a teleconferencing system, a media processing request from a client application for a video conference endpoint device;
   determining a client application identifier for the client application;
   retrieving a profile for the client application using the client application identifier;
   selecting a preferred load balancing approach for the client application based on the profile, wherein the preferred load balancing approach is selected to maximize data throughput, minimize response time, accommodate network availability, and/or avoid overload of resource use.

2. The method of claim 1, further comprising: updating the profile to reflect the client application's performance in view of the preferred load balancing technique and to suggest alternate load balancing techniques where the preferred load balancing technique was unsuccessful.

3. The method of claim 1, wherein selection of the preferred load balancing approach is based on anticipated latency measurements and/or current latency measurements.

4. The method of claim 1, wherein selection of the preferred load balancing approach is based on a geographic proximity of the client application to candidate teleconferencing servers.

5. The method of claim 4, wherein the geographic proximity is determined using a global routing table.

6. The method of claim 1, wherein selection of the preferred load balancing approach is based on anticipated server workload and/or current server workload.

7. The method of claim 1, wherein selection of the preferred load balancing approach is a round robin or least-loaded load balancing approach.

8. The method of claim 1, wherein the preferred load balancing approach incorporates a combination of two or more strategies selected from: latency metrics, geographic proximity metrics, server workload metrics, round robin server balancing, and least-loaded server balancing, wherein strategies are applied in serial.

9. The method of claim 1, wherein the preferred load balancing approach incorporates a combination of two or more strategies selected from: latency metrics, geographic proximity metrics, server workload metrics, round robin server balancing, and least-loaded server balancing, wherein strategies are applied in parallel.

10. The method of claim 1, wherein the profile is retrieved from a database of profiles.

11. A method comprising:
    determining a plurality of Points of Presence (POPs) that are accessible to a client application;
    selecting an optimal POP from the plurality of POPs for the client application based on latency statistics and geographic proximity to the client application;
    selecting an optimal server within the optimal POP based on server workload and an approach selected from round robin or least-loaded server balancing;
    receiving a request in connection with the client application; and
    redirecting the request to the optimal server,
    wherein if a redirect fails due to a firewall restricting access to the optimal server, logging the failure so that future requests from a network of the client application exclude the optimal server or use a proxy load balancing technique.

12. The method of claim 11, further comprising requesting one or more services from the optimal server, wherein the determining step is performed at a proxy server and the optimal server is a media server.

13. The method of claim 12, wherein the client application is unaware that it is interacting with an optimal server via a proxy server.

14. The method of claim 12, wherein upon failure of the optimal server, the proxy server will request services on behalf of the client application from an alternate server.

15. A method for providing a teleconferencing service, comprising:
    receiving a request from a user to join a teleconference;
    providing a web page that includes a menu of client application options for joining the teleconference;
    receiving a selection from the user of a client application option via the menu;
    selecting a preferred load balancing approach for the client application, wherein the preferred load balancing approach is selected to maximize data throughput, minimize response time, accommodate network availability, and/or avoid overload of resource use;
    providing instructions to launch the client application with a server selected based on the selected load balancing approach.

16. The method of claim 15, wherein the preferred load balancing approach is selected based on a profile for the client application.

17. The method of claim 15, wherein the instructions are provided via a universal resource identifier (URI) at the time the client application is launched.

18. The method of claim 15, wherein the preferred load balancing approach is selected prior to launch of the client application.

* * * * *